Patented Sept. 24, 1929

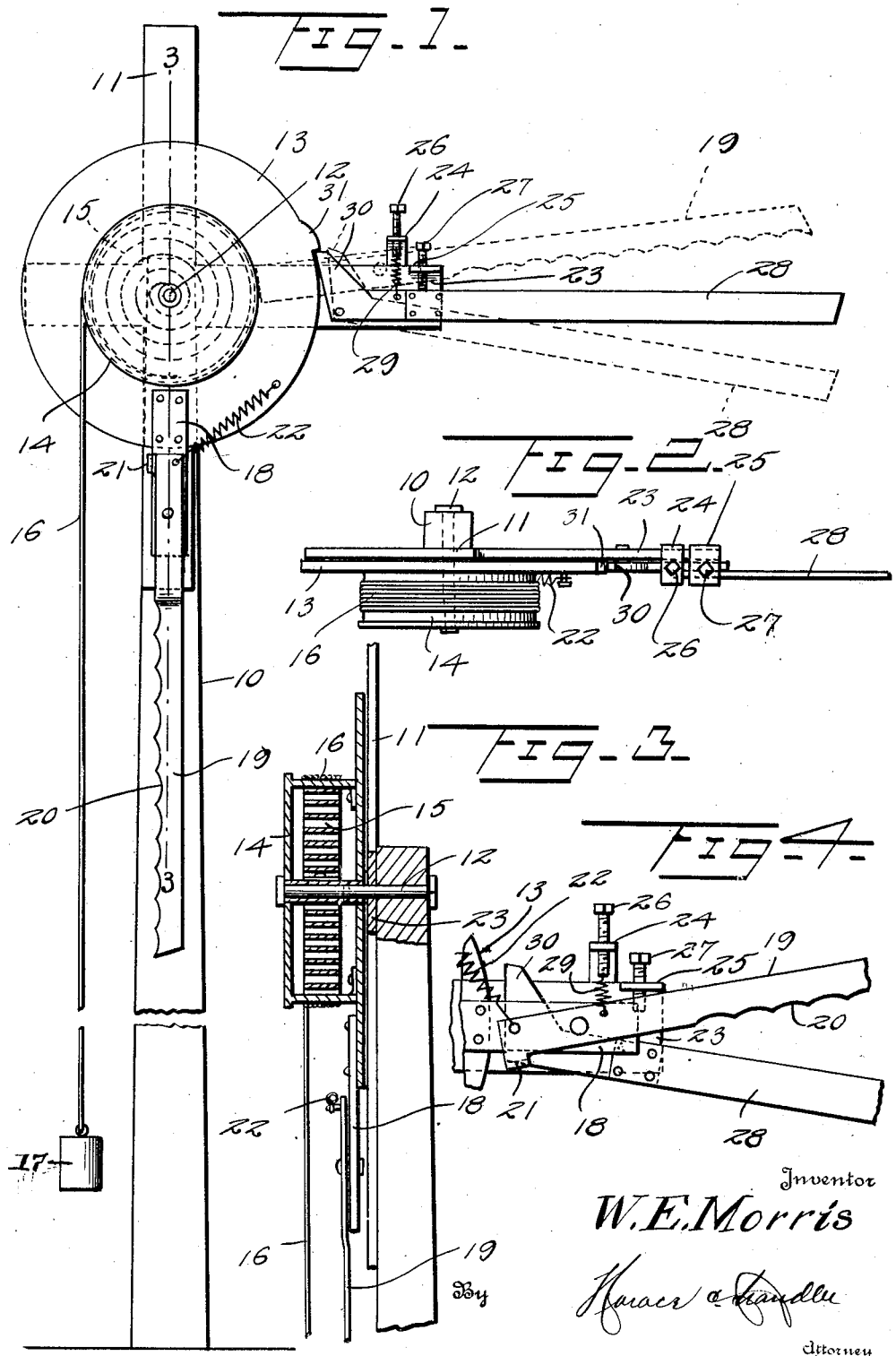

1,729,275

UNITED STATES PATENT OFFICE

WARDER E. MORRIS, OF SALEM, INDIANA, ASSIGNOR OF ONE-HALF TO ANNA REYMAN MORRIS, OF SALEM, INDIANA

BIRD TRAP

Application filed October 17, 1928. Serial No. 313,066.

This invention relates to new and useful improvements in traps, and particularly to traps for killing birds, such as crows, hawks, owls, eagles, and the like depredating birds.

One object of the present invention is to provide a device of this character, which is in the form of a roost, on which such birds may alight, and which is equipped with means, released by the weight of the bird, for killing such bird.

Another object is to provide a device of this character which includes a knife adapted to sever, or severely wound the bird roosted on the perch, such knife being so mounted and operated as to produce a drawing or shearing cut.

Another object is to provide a device of this character which, after having been operated to kill one bird, is automatically reset ready for the next bird to alight on the roost or perch.

A further object is to provide a device of this character which will be ineffective upon smaller birds.

Other objects and advantages will be apparent from the following description when taken in connection with the accompanying drawing.

In the drawing:

Figure 1 is an elevation of a bird trap made in accordance with the present invention.

Figure 2 is a top plan view of the same.

Figure 3 is a vertical sectional view on the line 3—3 of Figure 1.

Figure 4 is a fragmentary elevation, showing the knife in the position assumed when engaging a bird, to produce a shearing action.

Referring particularly to the accompanying drawing, 10 represents a pole or mast, of suitable height erected at the point where hawks, crows, eagles, and the like are wont to congregate. Secured to the upper end of the mast is a cruciform frame 11 and fixed in the intersection of the arms of said member, and extending right angularly therefrom, is a shaft 12. Rotatably mounted on the shaft 12 is a disk 13, and secured to the outer face thereof, in concentric relation to said shaft, is a drum 14, within which is arranged the motor spring 15. One end of this spring is secured to the drum, while the other, or inner end, is secured to the shaft 12. To the periphery of the drum is secured the upper end of a cord or wire 16, which extends downwardly to a point adjacent the lower end of the mast, where it is provided with a weight 17, for maintaining such cord or wire in taut condition, such cord or wire being adapted to be pulled downwardly to rotate the drum, and thereby wind the spring 15. Secured to the face of the disk 13, and extending radially therefrom, is an arm 18, and pivotally mounted on the outer end of said arm is the knife blade 19, which has a serrated cutting edge 20. On one edge of the blade 19, inwardly of the pivot thereof, there is formed a lug 21 which is held in engagement with the adjacent edge of the arm 18 by means of the coil spring 22, said spring being secured at its ends to the inner end of the blade and to the disk. Thus the knife blade is normally maintained in a position radially with respect to the disk and drum.

On the upper edge of the arm 23, which forms a part of the member 11, and which projects beyond the periphery of the disk 13, are formed the laterally extending flanges 24 and 25, each having a regulating screw 26 and 27 respectively. Pivotally mounted at its inner end, on the said arm 23, adjacent the periphery of the disk 13, is the outwardly extending, horizontal perch bar 28, said bar being preferably formed from thin metal, and being in the form of a blade for cooperation with the rotary knife 19, to kill the bird roosting on said perch. Connected at one end to the lower end of the screw 26, and at its other end to the perch bar 28, outwardly of the pivot thereof, is a coil spring 29, which normally urges the said bar upwardly, whereby to engage its nose 30, with the projection or lug 31, of the peripheral face of the disk 13. This serves as a stop to prevent rotation of the disk and drum under the influence of the motor spring 15. The other screw 27 serves to limit the upward movement of the perch bar, under the influence of the spring 29, whereby to prevent frictional contact between the nose 30 and the periphery of the said disk.

Normally, or when the trap is set, the parts are in the positions shown in Figure 2. The perch bar is elevated by the spring 29 so that its nose 30 engages with the lug 31, to hold the disk and drum against rotation. When a bird, of comparatively great weight, such as a crow, hawk, or the like, alights on the perch bar, such weight will cause the bar to be depressed, and in so doing withdraws the nose 30 from the lug 31, whereupon the motor spring rotates the disk and drum, carrying the knife blade around with it to strike the bird. As the knife strikes the bird, the blade will move to a small degree on its pivot, against the tension of the spring 22, so that the cutting edge of the blade will engage the bird with a shearing action, with the result that bird will be more surely cut. The blade cooperates with the perch bar, to sever or fatally wound the bird. After the knife blade has completed its cutting action upon the bird, it continues its movement, with the disk and drum, until the lug 31 again engages with the nose 30, whereupon the trap is set for the next bird. This rotation of the drum and knife will be accomplished each time that a bird of sufficient weight alights on the perch bar, until the spring in the drum is completely unwound. The operator then grasps the cord or wire and pulls downwardly whereby to unwind the cord from the drum, which causes the spring to be again wound, and the lug 31 engages the nose 30.

The spring 29 is of sufficient strength to resist depression by the weight of the smaller song birds, whereby to save such birds from destruction, the trap being only desired for action upon the larger birds of prey.

What is claimed is:

1. A bird trap including depressible perch member, motor driven knife adapted to strike a bird on the perch member, and means for causing the knife to produce a sliding cutting action across the bird upon striking the bird.

2. A bird trap including a motor driven knife, a perch member normally holding the knife against operation and releasable by the weight of a bird, and means for permitting a limited pivotal movement of the knife independently of the motor whereby to produce a sliding cutting action across the bird upon striking the bird on said perch member.

3. A bird trap including a rotatable motor driven knife, a perch member engaged with the motor of the knife to hold the same from operation until depressed by the weight of a bird, said knife being pivotally mounted and resiliently held whereby said knife may swing to produce a sliding cutting action across the bird upon striking the bird on the perch member.

4. A bird trap including a support, a perch on the support depressible by the weight of a bird, a rotary motor on the support, a radially extending knife pivotally carried by and rotatable with the motor, resilient means between the knife and motor for holding the knife in radial position and for permitting pivotal movement of the knife upon striking a bird on the perch to produce a sliding cutting action across the bird, and a detent engaged with the motor and releasable by the weight of the bird on the perch for releasing the motor.

In testimony whereof, I affix my signature.

WARDER E. MORRIS.